(12) United States Patent
Rajamannan

(10) Patent No.: US 9,144,202 B2
(45) Date of Patent: Sep. 29, 2015

(54) **TREATMENT OF PLANTS OF THE GENUS *MUSA***

(75) Inventor: A. Harry J. Rajamannan, Minneapolis, MN (US)

(73) Assignee: Agro-K Corporation, Minneapolis, MN (US)

( * ) Notice: Subject to any disclaimer, the term of this patent is extended or adjusted under 35 U.S.C. 154(b) by 1520 days.

(21) Appl. No.: 12/496,306

(22) Filed: Jul. 1, 2009

(65) Prior Publication Data

US 2011/0000129 A1    Jan. 6, 2011

(51) Int. Cl.
*A01G 7/06* (2006.01)
*C05G 3/00* (2006.01)

(52) U.S. Cl.
CPC .............. *A01G 7/06* (2013.01); *C05G 3/0052* (2013.01); *C05G 3/0076* (2013.01)

(58) Field of Classification Search
CPC ....................................................... A01G 7/06
USPC ...... 47/58.1 FV, 58.1 R, 57.5; 504/117; 71/6, 71/31, 64.13
See application file for complete search history.

(56) References Cited

U.S. PATENT DOCUMENTS

| 6,114,285 A | 9/2000 | Padilla et al. |
| 6,372,238 B1 | 4/2002 | Rajamannan |
| 2004/0241250 A1 | 12/2004 | Rajamannan |
| 2004/0242418 A1 | 12/2004 | Rajamannan |
| 2004/0242419 A1 | 12/2004 | Rajamannan |
| 2004/0242424 A1 | 12/2004 | Rajamannan |
| 2005/0044787 A1 | 3/2005 | Rajamannan |
| 2007/0142227 A1 | 6/2007 | Rajamannan |

FOREIGN PATENT DOCUMENTS

WO    WO 2009/077613 A1    6/2009

OTHER PUBLICATIONS

Scandelai, L.H.M., et al., "Agronomic characteristics of 'Prata-anã' and 'Maçã' bananas micropropagated," Revista Brasileira de Fruticultura, vol. 28, No. 1, pp. 1-6, 2006.

*Primary Examiner* — Monica Williams
(74) *Attorney, Agent, or Firm* — Dicke, Billig & Czaja, PLLC

(57) ABSTRACT

Methods of treating agricultural fruit crops of the genus *Musa* having a mother plant and an adjoined offspring, or daughter plant, involve implanting at least one nutrient component into a pseudo stem of the mother plant after harvesting fruit from the mother plant. The nutrients implanted into the pseudo stem of the mother plant after harvesting are then available to the daughter plant more efficiently than nutrients applied to the soil.

21 Claims, 5 Drawing Sheets

TREATMENT OF PLANTS OF THE GENUS *MUSA*

TECHNICAL FIELD

The present invention relates generally to providing nutrients to agricultural fruit crops of the genus *Musa*, and in particular, in one or more embodiments, the present disclosure relates to methods of providing additional nutrients to the daughter plant of a banana plant through the mother plant.

BACKGROUND

Plants of the genus *Musa*, including banana plants as well as plantain plants, are herbs, with a main stem below the soil surface, called a corm, and only the leaves and fruits above the ground in the form of a sheath, called a pseudo stem. A banana plant flowers around six months after a new planting. The flower replaces the last leaf of the pseudo stem and no more leaves emerge as the flower stem comes from the corm. The flower emerges and becomes a fruit bunch. Fruit is harvested from such agricultural fruit crops about three months after flowering.

When the fruit bunch is harvested, the entire leaf cluster and the fruit is harvested off the main pseudo stem and much of the pseudo stem is left in place. It is common to cut the pseudo stem down to approximately 1 to 2 m from the soil surface. This remaining pseudo stem is often referred to as a caballo, the Spanish word for horse. The plant that flowers and bears a fruit bunch is often referred to as a mother plant. When the mother plant is bearing a fruit bunch, a new plant typically emerges next to the mother plant and grows out of the corm and is often referred to as a daughter plant. This daughter plant is an adjoining offspring of the mother plant. Banana plants can live and produce fruits for several generations in this manner. It is not unusual to produce up to 20 generations of plants from a single planting.

Nutrients, such as potassium (K), often in the form of potassium chloride (KCl) fertilizers, are typically applied on the ground for banana plants in a circle approximately 30 cm around the pseudo stem. For example, potassium chloride may be applied at a rate of around 800-1000 kg per year per hectare for 2,000 plants planted in one hectare. The total application is typically divided into 10 applications of 50 kg every 30-35 days. This translates into approximately 50 grams of potassium chloride every application for each banana plant.

It is well known that when fertilizers are applied to the ground to feed the plants, a significant amount of these fertilizers are not used by the plants. It has been estimated that if the pH of the soil is 7, then the plants are able to use about 20% of the fertilizers applied. If the pH is 5, then the plants able to use only about 10% of the fertilizers applied. Farmers often use lime to neutralize the soil to a pH of 7 to be able to allow more of the fertilizers to be absorbed by the plant. The fertilizers applied to the ground are water soluble and available to the plants. However, these soluble nutrients often become bound up with the soil, or are washed away by rainfall, and therefore become unavailable for uptake by the plant.

U.S. Pat. No. 6,372,238, issued Apr. 16, 2002 to Rajamannan describes direct injection of nutrients and other agricultural chemicals in the fertilization and treatment of banana and plantain plants prior to harvest. These chemicals are injected into the pseudo stem of the fruit-bearing plants. Such direct injection facilitates an improvement in the availability of nutrients and other agricultural chemicals to the fruit-bearing plants over soil or foliar application.

As the cost of nutrients and other agricultural chemicals continue to rise, efficient use of the chemicals becomes increasingly important. Furthermore, improving the efficiency of these agricultural chemicals also reduces the environmental impact of the agricultural operation.

For the reasons stated above, and for other reasons which will become apparent to those skilled in the art upon reading and understanding the present specification, there is a need in the art for alternative approaches to providing nutrients to plants of the genus *Musa*.

DETAILED DESCRIPTION

In the following detailed description of the present embodiments, the embodiments are described in sufficient detail to enable those skilled in the art to practice the invention, and it is to be understood that other embodiments may be utilized and that process, chemical, or mechanical changes may be made without departing from the scope of the present disclosure. The following detailed description is, therefore, not to be taken in a limiting sense.

Figure 1:
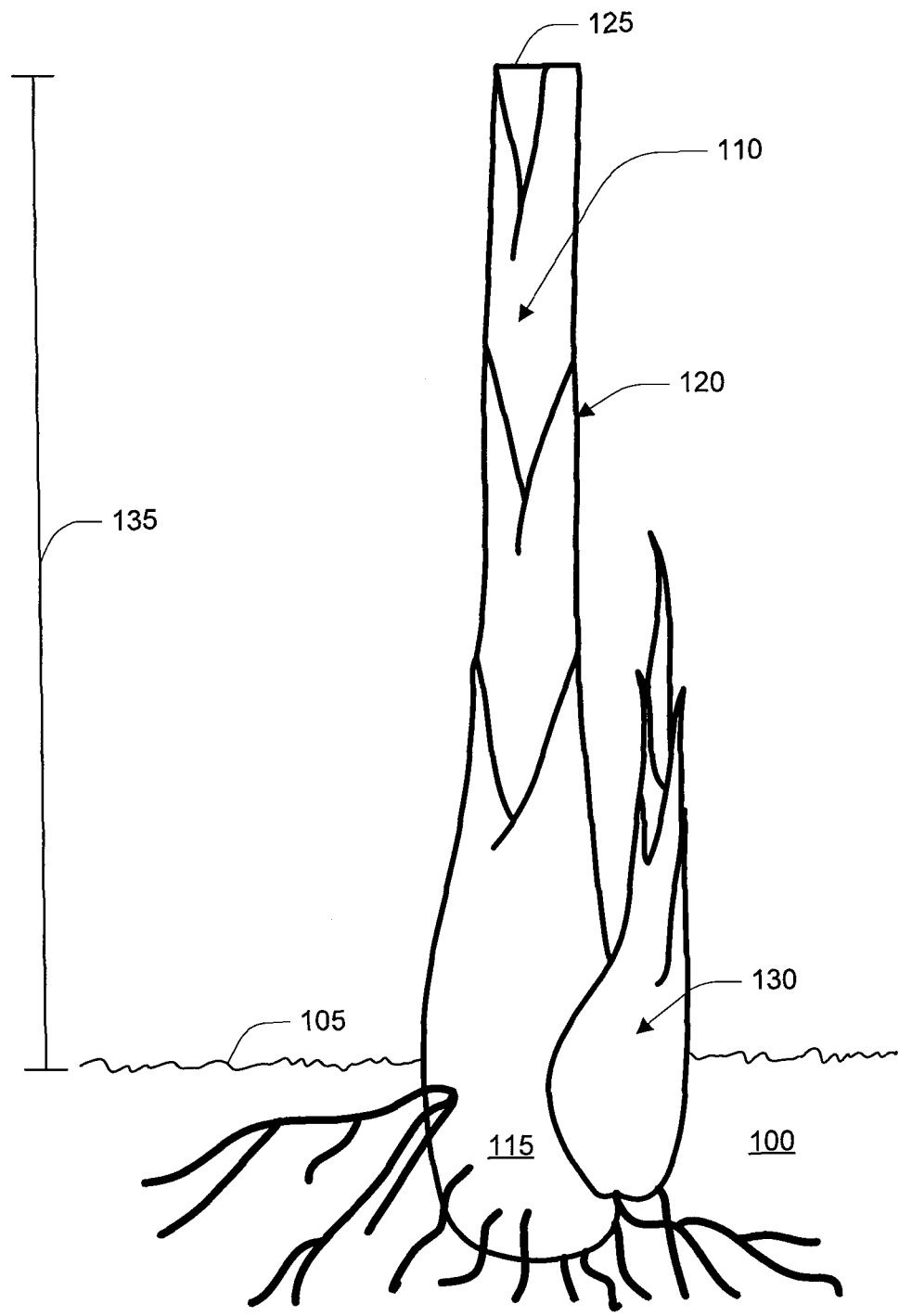
FIG. 1 is a representation of a banana plant showing a pseudo stem of a mother plant and an adjoining daughter plant.

FIG. 1 is a representation of a banana plant. Although the following discussion is focused on banana plants, it will be apparent that the methods described herein are similarly applicable to all such plants of the genus *Musa*. The banana plant has a mother plant 110 and a daughter plant 130 growing from the mother plant 110. The mother plant 110 has its corm 115 below a surface 105 of the soil 100 and a pseudo stem 120 extending above the surface 105 of the soil 100. The daughter plant 130 is an adjoining offspring of the mother plant 110 and obtains a significant amount of its nutrients from the corm 115 of the mother plant 110.

The pseudo stem 120 is primarily water and is where nutrients of the plant, in a water soluble form, are stored. When the mother plant 110 has completed the bearing of a flower (not shown in the figures) and the subsequent development of the fruit (not shown in the figures) to a harvestable size, it is harvested. Once harvested, the banana growers cut the top of the plant to remove its leaves. Whatever is left of the pseudo-stem after harvest is often referred to as a caballo in the art.

The pseudo stem 120 in FIG. 1 is shown to be cut back, having its top 125 extending a distance 135 from the surface 105 of the soil 100. Banana plants are often cut back after harvest, or during the harvesting process, to utilize the nutrients stored in the caballo. The cut is generally made to place the top 125 of the pseudo stem 120 approximately 1.5 m or higher from the surface 105 of the soil 100. The cut top 125 may then be covered to further reduce susceptibility to disease or insect infestation.

The daughter plant 130 is able to continue to obtain nutrients from the mother plant 110 as the caballo dries. This drying process generally occurs over a period of about eight weeks. It has been suggested by scientists that 40% of the nutrients needed by the daughter plant 130 to grow into another flower-bearing and fruit-producing plant are provided by the caballo. However, the daughter plant 130 will need nutrients in addition to those naturally obtained from the mother plant 110 after harvest of the mother plant 110 in order to develop into a fruit-bearing plant of its own. These nutrients are primarily nitrogen and potassium. The various embodiments address this nutrient shortcoming.

Various embodiments utilize fertilizers inserted into the pseudo stem 120 of the mother plant 110 after the fruit bunch (not shown in the figures) is harvested from the mother plant 110. Such fertilization by inserting the nutrients into the dying caballo can be used to reduce or eliminate ground application of fertilizers for the daughter plant 130. It has been estimated that a savings of 50-60% of the cost associated with ground fertilization may be obtained using the approach of various embodiments of the disclosure as well as reduced impact on the environment. Because the efficiency of the delivery of nutrients through the caballo appears to be significantly better than the delivery of nutrients applied to the soil, the various embodiments facilitate a reduction in total fertilizer use, thus leading to the reduction in cost and reduction in environmental impact.

Various embodiments described herein are not limited to a specific form of the fertilizer inserted into the pseudo stem 120. Thus, the fertilizer could take a variety of forms suitable for insertion into the pseudo stem 120 after harvest. For example, the fertilizer may be in the shape of a spike, having sufficient structural integrity to support insertion of the spike into the pseudo stem 120. For example, a dry fertilizer can be bound together with a polymer or adhesive in the shape of a spike. Alternatively, the fertilizer may be in dry or gel form, and encased in a plastic or similar material that is either porous or semi-permeable. For a further embodiment, the fertilizer may be encapsulated in a water-soluble shell. Fertilizer implants can further include fibrous materials having fertilizer attached to, or infused into, the fibers of the material. Fertilizer implants can take the form of pellets that can be implanted or shot into the pseudo stem 120 by a propellant mechanism. Fertilizer may further be implanted by injecting a liquid or gel fertilizer into the pseudo stem 120 using a syringe. The opening entry to the pseudo stem 120 may be closed to the outside after insertion or injection of the fertilizer, using a sealant, stopper or bandage, to reduce the risk of disease or insect attack.

It has been discovered that providing too much fertilizer directly into the pseudo stem 120 after harvest accelerates the process of drying. Such an acceleration is detrimental, as the caballo of the mother plant 110 can no longer transfer its own nutrients to the daughter plant 130 once it has dried. For example, it was discovered that as little as 200 g of potassium chloride applied near the top 125 of a pseudo stem 120 after harvest led to a reduction in yield of the daughter plant 130.

For one embodiment, an implantation is made in an upper portion of the pseudo stem 120. For example, the implantation may occur within 50 cm of the top 125 of the pseudo stem 120. For a further embodiment, the implantation occurs about half way between the top 125 of the pseudo stem 120 and the surface 105 of the soil 100. For a still further embodiment, the implantation is made within seven days after harvest. It is, however, believed that making the implantation at the day of harvest to within two days after harvest provides added benefits. As one example, a potassium (K) fertilizer, such as potassium chloride, is implanted into the pseudo stem 120 at a total dosage of approximately 125 g, either as a single implant or as multiple implants, within two days of harvest, where each of the one or more implants is implanted into the pseudo stem 120 at a distance of between 15 cm and 30 cm of the top 125 of the pseudo stem 120. Unless noted otherwise, dosages refer to the fertilizer (potassium chloride in this example) rather than the active nutrient (potassium in this example).

For another embodiment, a second implantation is made in a middle portion of the pseudo stem 120 subsequent to a first implantation. For one example, the second implantation may occur within 20 cm of a mid-point of the pseudo stem 120. For another example, the second implantation may occur within 10 cm of the mid-point of the pseudo stem 120. The mid-point occurs at a point in the pseudo stem 120 that is equidistant from the top 125 and the surface 105, i.e., ½ of the distance 135 from either the top 125 and the surface 105. For one embodiment, the second implantation is made between 10 and 25 days after harvest. It is, however, believed that making the implantation between 15 and 20 days after harvest provides added benefits. As one example, a potassium (K) fertilizer, such as potassium chloride, is implanted into the pseudo stem 120 at a total first dosage of approximately 65 g, either as a single implant or as multiple implants, within two days of harvest, where each of the one or more first implants is implanted into the pseudo stem 120 at a distance of between 15 cm and 30 cm of the top 125 of the pseudo stem 120, and additional potassium fertilizer is subsequently implanted into the pseudo stem 120 at a total second dosage of approximately 65 g, either as a single implant or as multiple implants, between 15 and 20 days after harvest, where each of the one or more second implants is implanted into the pseudo stem 120 at a location between where the first implants occurred and the surface 105 of the soil 100. As one example, the one or more second implants may be implanted into the pseudo stem 120 within approximately 20 cm from the mid-point of the pseudo stem 120. The general intent of spacing implants out over time and down the pseudo stem 120 is to reduce the impact of the fertilizer on the drying process of the pseudo stem 120 and to implant fertilizer in a portion of the pseudo stem 120 that is still moist. The second implantation need not utilize the same dosage level as the first implantation, nor even the same nutrients.

For still another embodiment, a third implantation is made in a lower portion of the pseudo stem 120 subsequent to the second implantation. For one example, the third implantation may occur in the pseudo stem 120 within 50 cm of the surface 105 of the soil 100. For one embodiment, the third implantation is made between 25 to 35 days after harvest. It is, however, believed that making the implantation approximately 30 days after harvest provides added benefits. For a further embodiment, the third implantation may utilize the same dosage level as the second implantation. It is generally expected that a third implantation provides only marginal benefits, and is recommended only if the nutrient levels of the daughter plant 130 appear below normal, such as if its leaves look unhealthy in color or the size of its pseudo stem looks abnormally small. The third implantation need not utilize the same dosage levels as the first or second implantations, nor even the same nutrients.

Field studies were performed comparing various treatments to controls. These studies were conducted in a banana farm in Costa Rica where the production of fruit bunches was historically uniform at between about 27 to 30 kg per bunch. Ten banana plants were selected at flowering, meaning that the bananas were approximately the same age, and this selection was replicated four times per treatment. If there were seven treatments, a total of 7 treatments×4 replications×10 plants were selected. When the flowers became a fruit bunch and matured in three months, they were harvested. The data were kept for each of these plants from the point of harvest through the development of their daughter plant.

The application of the various potassium chloride fertilizer spikes, soil treatment, or no soil treatment for these various studies started when the mother plants' fruit was harvested. The final data used to compare the treatments were obtained when the fruit bunches of the daughter plants were harvested and weighed. The average harvest weights of the daughter plants were the data used to compare the treatments in the experiment.

Figure 2:
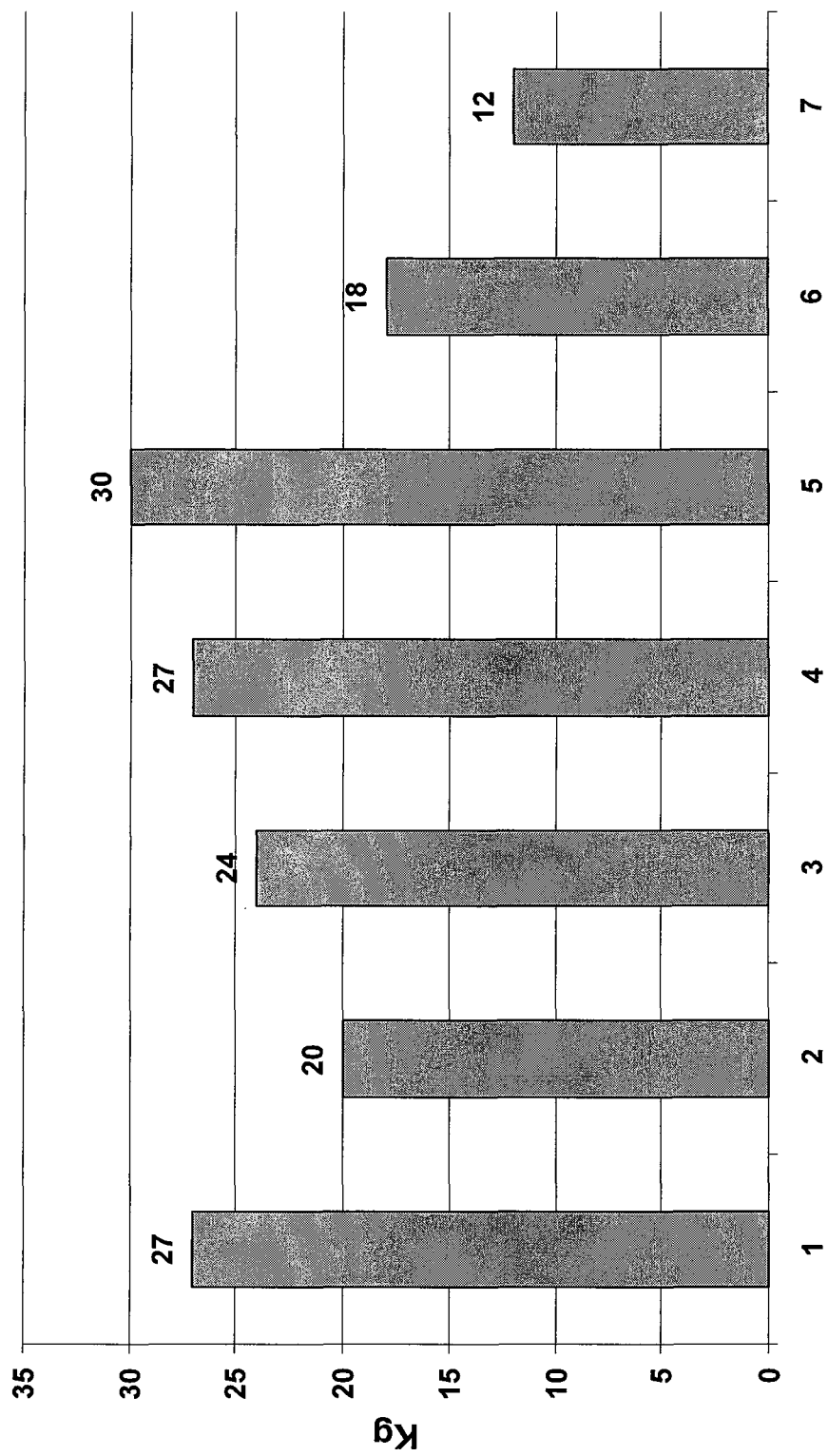
FIG. 2 is a graph summarizing the results of a test comparing different dosages of potassium chloride implanted into a pseudo stem of a mother plant against control groups.

FIG. 2 is a graph summarizing the results of a test comparing different dosages of potassium chloride implanted into a pseudo stem of a mother plant against control groups. Treatment 1 of FIG. 2 is a control using a standard fertilizer treatment of potassium chloride applied to soil over one year at a total of 600 g/plant. Treatment 2 of FIG. 2 is a control using no potassium fertilizer applied over the year. Treatment 3 of FIG. 2 is a treatment of implanting 50 g of potassium chloride near the top of each pseudo stem at harvest. Treatment 4 of FIG. 2 is a treatment of implanting 100 g of potassium chloride near the top of each pseudo stem at harvest. Treatment 5 of FIG. 2 is a treatment of implanting 150 g of potassium chloride near the top of each pseudo stem at harvest. Treatment 6 of FIG. 2 is a treatment of implanting 200 g of potassium chloride near the top of each pseudo stem at harvest. And treatment 7 of FIG. 2 is a treatment of implanting 250 g of potassium chloride near the top of each pseudo stem at harvest. As shown in FIG. 2, there is a peak of yield occurring at treatment 5, with lower and higher levels of fertilizer resulting in reduced yield. In fact, higher dosage levels actually resulted in a reduction of yield over treatment 2 (no fertilizer), leading to the conclusion that accelerated drying of the caballo reduces the ability of the mother plant's caballo to transfer nutrients to feed the daughter plant.

Figure 3:
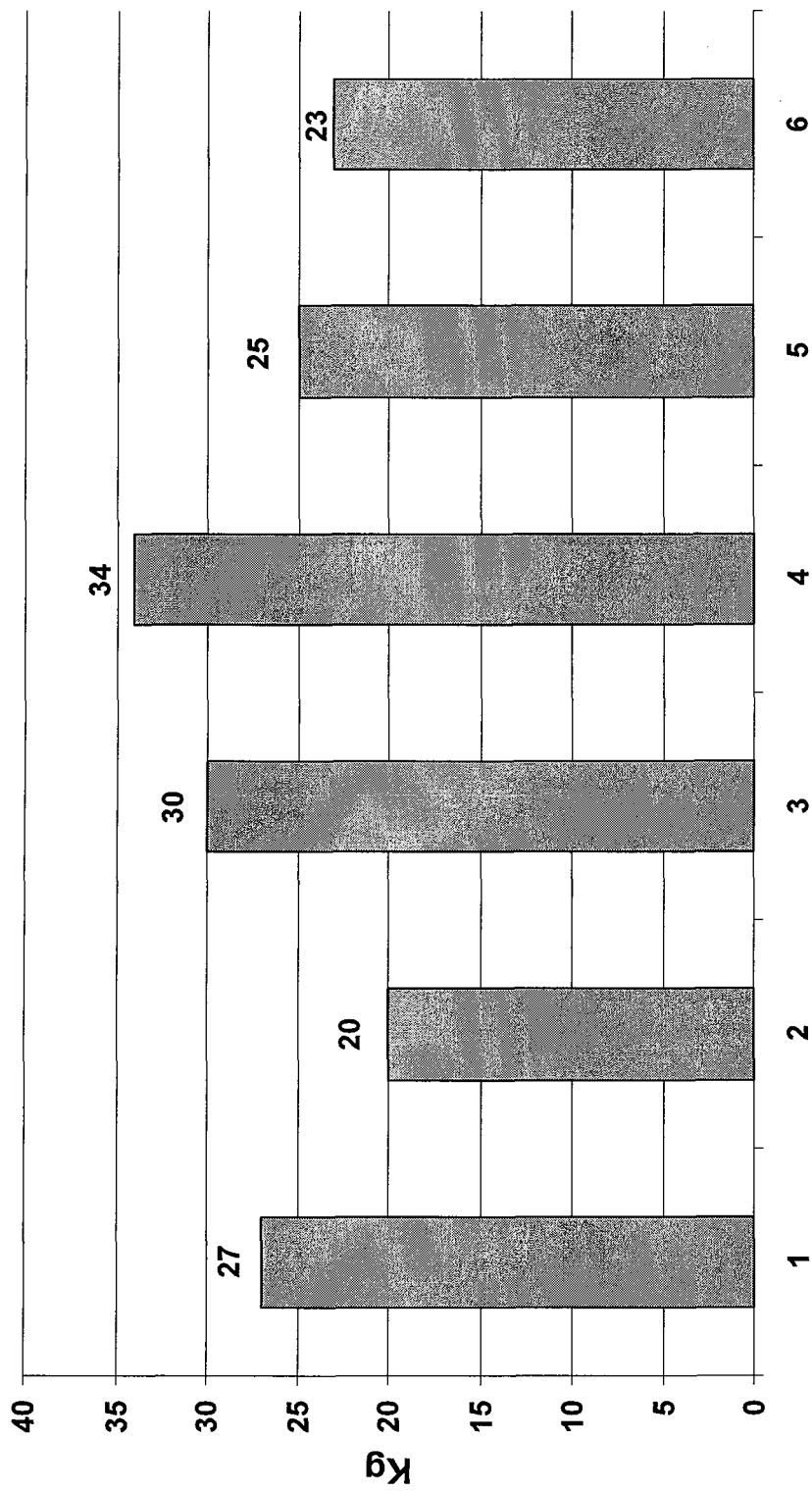
FIG. 3 is a graph summarizing the results of a test comparing different implantation points for potassium chloride implanted into a pseudo stem of a mother plant against control groups.

FIG. 3 is a graph summarizing the results of a test comparing different implantation points for potassium chloride implanted into a pseudo stem of a mother plant against control groups. Treatment 1 of FIG. 3 is a control using a standard fertilizer treatment of potassium chloride applied to soil over one year at a total of 600 g/plant. Treatment 2 of FIG. 3 is a control using no potassium fertilizer applied over the year. Treatment 3 of FIG. 3 is a treatment of implanting 150 g of potassium chloride near the top of each pseudo stem at harvest. Treatment 4 of FIG. 3 is a treatment of implanting 75 g of potassium chloride near the top of each pseudo stem at harvest and another 75 g of potassium chloride near the middle of each pseudo stem 15 days after harvest. Treatment 5 of FIG. 3 is a treatment of implanting 150 g of potassium chloride near the middle of each pseudo stem at harvest. And treatment 6 of FIG. 3 is a treatment of implanting 150 g of potassium chloride near the bottom of each pseudo stem (approximately 30 cm from soil surface) at harvest. As shown in FIG. 3, there is a peak of yield occurring at treatment 4, leading to the conclusion that initial fertilizer implantation is best made toward the top of the pseudo stem and that fertilizer delivery can be improved by spacing the implantations out over time.

Figure 4:
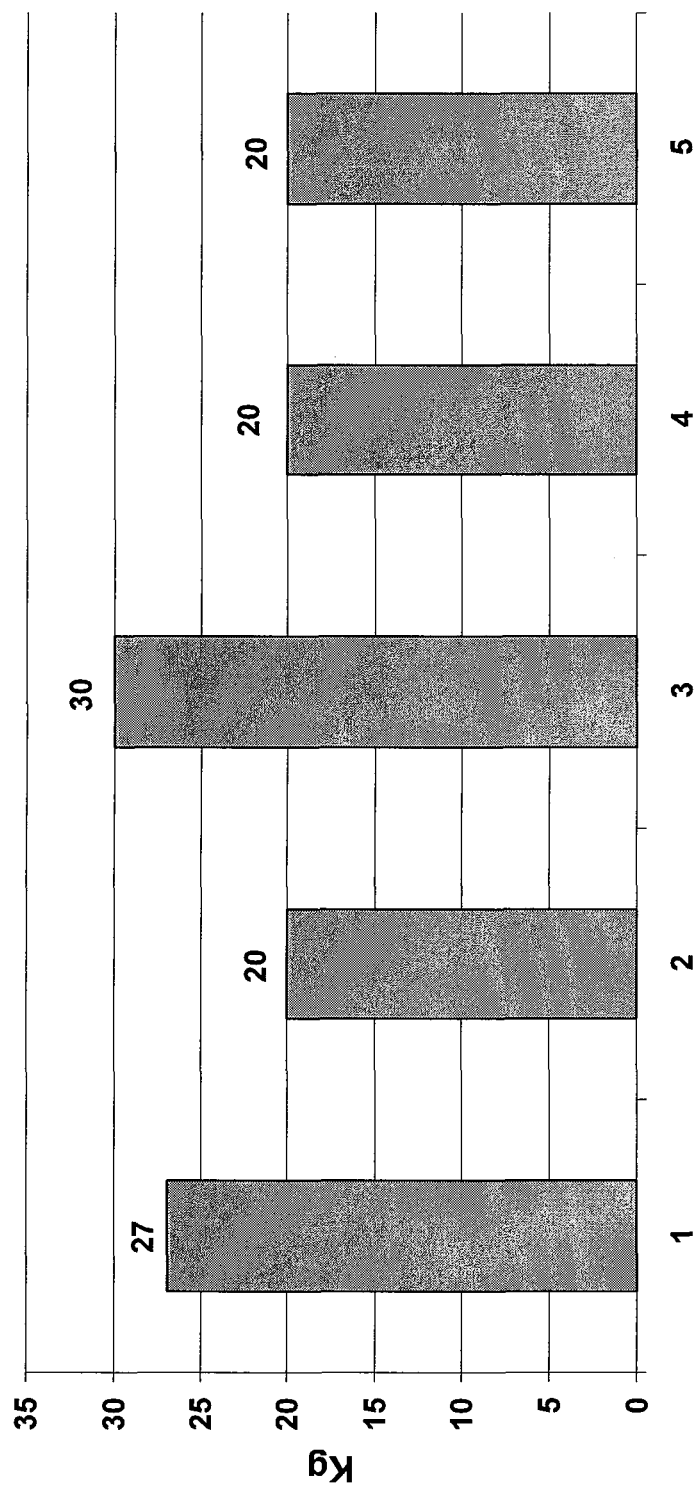
FIG. 4 is a graph summarizing the results of a test comparing different timings of implantation of potassium chloride into a pseudo stem of a mother plant against control groups.

FIG. 4 is a graph summarizing the results of a test comparing different timings of implantation of potassium chloride into a pseudo stem of a mother plant against control groups. Treatment 1 of FIG. 4 is a control using a standard fertilizer treatment of potassium chloride applied to soil over one year at a total of 600 g/plant. Treatment 2 of FIG. 4 is a control using no potassium fertilizer applied over the year. Treatment 3 of FIG. 4 is a treatment of implanting 150 g of potassium chloride near the top of each pseudo stem at harvest. Treatment 4 of FIG. 4 is a treatment of implanting 150 g of potassium chloride near the top of each pseudo stem 15 days after harvest. And treatment 5 of FIG. 4 is a treatment of implanting 150 g of potassium chloride near the top of each pseudo stem 30 days after harvest. As shown in FIG. 4, there is a peak of yield occurring at treatment 3. By 15 days after harvest, the pseudo stem had dried down to the middle, so the fertilizer injected at 15 or 30 days was ineffectual. Thus, the implantation of fertilizer should be made in a portion of the pseudo stem that has not yet dried.

Figure 5:
FIG. 5 is a graph summarizing the results of a test comparing a single implantation of potassium chloride into a pseudo stem of a mother plant against multiple implantations of potassium chloride into a pseudo stem of a mother plant at the same total dosage levels, but utilizing different timing.

FIG. 5 is a graph summarizing the results of a test comparing a single implantation of potassium chloride into a pseudo stem of a mother plant against multiple implantations of potassium chloride into a pseudo stem of a mother plant at the same total dosage levels, but utilizing different timing. Treatment 1 of FIG. 5 is a treatment of implanting 150 g of potassium chloride near the top of each pseudo stem at harvest. Treatment 2 of FIG. 5 is a treatment of implanting 75 g of potassium chloride near the top of each pseudo stem at harvest and implanting another 75 g of potassium chloride near the mid-point of each pseudo stem 15 days after harvest. As shown in FIG. 5, treatment 2 had improved yield, thus reaffirming the conclusion that fertilizer delivery through the pseudo stem can be improved by spacing the implantations out over time. Using this improved delivery, smaller total dosages levels may be used if the implantations are spread out over time. For example, instead of a single implantation of 150 g of potassium chloride, a first implantation of no more than 75 g of potassium chloride and a second implantation of no more than 75 g of potassium chloride may provide similar benefits to a single implantation of 150 g of potassium chloride.

Although the field testing evaluated a single nutrient, i.e., potassium, various embodiments can use additional or alternate nutrients. For example, in combination with, or in substitution of, potassium, various embodiments may utilize one or more of calcium (Ca), magnesium (Mg), zinc (Z), manganese (Mn), iron (Fe) and copper (Cu). In essence, the methods described herein can be used to provide whatever nutrients are desired to be provided to the daughter plant.

Although the disclosure has focused on the implantation of fertilizers (nutrients), it is believed that the physiological action of utilizing the caballo of the mother plant for a phased-in introduction of nutrients to the daughter plant would be further applicable to additional agricultural chemicals. For example, plant growth regulators, such as gibberellins, auxins and cytokinens, could be added to the fertilizer for implantation into the mother plant. Additionally, systemic resistance inducers, for controlling such things as fungi, insects or nematodes, are commonly known in the art and could also be added to the fertilizer for implantation into the mother plant.

Furthermore, additional chemical components that do not materially affect the basic and novel properties disclosed herein may also be implanted into the pseudo stem of the mother plant along with the fertilizers. Some examples include fillers, dyes, stabilizers, buffers, conditioners, surfactants and preservatives.

Although specific embodiments have been illustrated and described herein, it will be appreciated by those of ordinary skill in the art that any arrangement that is calculated to achieve the same purpose may be substituted for the specific embodiments shown. Many adaptations of the disclosure will be apparent to those of ordinary skill in the art. Accordingly, this application is intended to cover any adaptations or variations of the disclosure.

What is claimed is:

1. A method of treating agricultural fruit crops of the genus *Musa* having a mother plant and adjoined offspring, comprising:
   implanting at least one nutrient component into a pseudo stem of the mother plant;
   wherein the implanting of the at least one nutrient component into the pseudo stem is performed after harvesting fruit from the mother plant.

2. The method of claim 1, wherein the implanting of the at least one nutrient component into the pseudo stem of the mother plant is performed within seven days after cutting the pseudo stem of the mother plant and is performed at a location of the pseudo stem within 50 cm of a top of the cut pseudo stem.

3. The method of claim 1, wherein the implanting of the at least one nutrient component into the pseudo stem of the mother plant comprises implanting at least potassium into the pseudo stem of the mother plant.

4. The method of claim 3, wherein implanting at least potassium into the pseudo stem of the mother plant comprises implanting less than 200 g of potassium chloride.

5. The method of claim 4, wherein implanting less than 200 g of potassium chloride comprises implanting no more than 150 g of potassium chloride.

6. The method of claim 1, wherein the implanting of the at least one nutrient component into the pseudo stem of the mother plant comprises implanting more than one nutrient component.

7. The method of claim 6, wherein implanting more than one nutrient component comprises implanting two or more nutrients selected from the group consisting of potassium, calcium, magnesium, zinc, manganese, iron and copper.

8. The method of claim 1, further comprising implanting at least one additional agricultural chemical with the at least one nutrient component into the pseudo stem of the mother plant, wherein the at least one additional agricultural chemical is selected from the group consisting of plant growth regulators and systemic resistance inducers.

9. A method of treating agricultural fruit crops of the genus *Musa* having a mother plant and adjoined offspring, comprising:
   performing a first implantation of at least one nutrient component into a pseudo stem of the mother plant within seven days after harvesting fruit from the mother plant, wherein the first implantation is performed at a location of the pseudo stem within 15 to 30 cm from a top of the pseudo stem; and
   performing a second implantation of at least one nutrient component into the pseudo stem of the mother plant between 10 and 25 days after harvesting fruit from the mother plant, wherein the second implantation is performed at a location of the pseudo stem within approximately 20 cm from a mid-point of the pseudo stem.

10. The method of claim 9, wherein performing the first implantation occurs within two days after harvesting fruit from the mother plant.

11. The method of claim 9, wherein performing the first implantation and performing the second implantation comprises implanting at least potassium into the pseudo stem of the mother plant.

12. The method of claim 11, wherein implanting at least potassium into the pseudo stem of the mother plant comprises implanting less than 200 g of potassium chloride total between the first implantation and the second implantation.

13. The method of claim 12, wherein implanting less than 200 g of potassium chloride total between the first implantation and the second implantation comprises implanting no more than 75 g of potassium chloride in the first implantation and implanting no more than 75 g of potassium chloride in the second implantation.

14. The method of claim 9, wherein the implanting of the at least one nutrient component into the pseudo stem of the mother plant comprises implanting more than one nutrient component.

15. The method of claim 14, wherein implanting more than one nutrient component comprises implanting two or more nutrients selected from the group consisting of potassium, calcium, magnesium, zinc and manganese.

16. The method of claim 9, further comprising implanting at least one additional agricultural chemical with the at least one nutrient component into the pseudo stem of the mother plant, wherein the at least one additional agricultural chemical is selected from the group consisting of plant growth regulators and systemic resistance inducers.

17. The method of claim 9, further comprising:
   performing a third implantation of at least one nutrient component into the pseudo stem of the mother plant between 25 and 35 days after harvesting fruit from the mother plant, wherein the third implantation is performed after the second implantation and at a location of the pseudo stem within 50 cm of a surface of soil from which the pseudo stem extends.

18. The method of claim 9, wherein performing a first implantation of at least one nutrient component and performing a second implantation of at least one nutrient component comprises performing implantations of the same at least one nutrient component.

19. A method of treating agricultural fruit crops of the genus *Musa* having a mother plant and adjoined offspring, comprising:
   performing a first implantation of potassium chloride at a first dosage level into a pseudo stem of the mother plant within two days after harvesting fruit from the mother plant, wherein the first implantation is performed at a first location of the pseudo stem within 15 to 30 cm from a top of the pseudo stem; and
   performing a second implantation of potassium chloride at a second dosage level into the pseudo stem of the mother plant between 15 and 20 days after harvesting fruit from the mother plant, wherein the second implantation is performed at a second location of the pseudo stem between the first location and a surface of soil from which the pseudo stem extends and wherein the second location is at a point of the pseudo stem that is still moist at a time of the second implantation;
   wherein a total of the first dosage level and the second dosage level is less than 200 g of potassium chloride.

20. The method of claim 19, wherein performing a first implantation of potassium chloride at a first dosage level and performing a second implantation of potassium chloride at a second dosage level, comprises using a first dosage level of no more than 75 g of potassium chloride and using a second dosage level of no more than 75 g of potassium chloride.

21. The method of claim 19, wherein performing a second implantation at a second location comprises performing the second implantation wherein the second location is at a point of the pseudo stem that is within 20 cm of a midpoint of the pseudo stem.

* * * * *